(12) United States Patent
Huyssen

(10) Patent No.: US 11,554,849 B2
(45) Date of Patent: Jan. 17, 2023

(54) TAILLESS AIRCRAFT

(71) Applicant: University of Pretoria, Pretoria (ZA)

(72) Inventor: Reinhard Joachim Huyssen, Menlo Park (ZA)

(73) Assignee: University of Pretoria, Pretoria (ZA)

( * ) Notice: Subject to any disclaimer, the term of this patent is extended or adjusted under 35 U.S.C. 154(b) by 763 days.

(21) Appl. No.: 16/478,574

(22) PCT Filed: Jan. 18, 2018

(86) PCT No.: PCT/IB2018/050307
§ 371 (c)(1),
(2) Date: Jul. 17, 2019

(87) PCT Pub. No.: WO2018/134756
PCT Pub. Date: Jul. 26, 2018

(65) Prior Publication Data
US 2020/0047872 A1    Feb. 13, 2020

(30) Foreign Application Priority Data

Jan. 19, 2017  (ZA) .................... 2017/00443

(51) Int. Cl.
*B64C 9/06*     (2006.01)
*B64C 17/02*    (2006.01)
(Continued)

(52) U.S. Cl.
CPC .............. *B64C 9/06* (2013.01); *B64C 17/02* (2013.01); *B64C 3/00* (2013.01); *B64C 17/10* (2013.01);
(Continued)

(58) Field of Classification Search
CPC .. B64C 9/06; B64C 17/02; B64C 3/00; B64C 17/10; B64C 39/10; B64C 2201/028;
(Continued)

(56) References Cited

U.S. PATENT DOCUMENTS 2,836,380 A * 5/1958 Pearson .................... B64C 9/20
                                                          244/216
3,064,928 A * 11/1962 Toll .......................... B64C 3/40
                                                           244/46
(Continued)

FOREIGN PATENT DOCUMENTS

CH          242778 A        5/1946
CN         1816476 A        8/2006
(Continued)

OTHER PUBLICATIONS

Agenbag, Daniël S., et al. "Pitch Handling Qualities Investigation of the Tailless Gull-Wing Configuration." Journal of Aircraft, vol. 46, No. 2, 2009, pp. 683-691. Crossref, https://doi.org/10.2514/1.39755 (Year: 2009).*

(Continued)

*Primary Examiner* — Christopher D Hutchens
*Assistant Examiner* — Steven J Shur
(74) *Attorney, Agent, or Firm* — The Webb Law Firm

(57) ABSTRACT

The invention relates to an aircraft having a tailless fuselage. The fuselage has a body which includes a transverse trailing edge. The aircraft further includes a wing having two sides which protrude from opposite sides of the fuselage. The body typically has a fineness ratio of between 3 and 7. Each side of the wing has an inner section having a first dihedral angle and an outer section having a second dihedral angle, the second dihedral angle being less than the first dihedral angle. At least part of the outer section is typically swept back. The configuration of the aircraft provides it with improved flight efficiency.

19 Claims, 3 Drawing Sheets

(51) Int. Cl.
*B64C 3/00* (2006.01)
*B64C 17/10* (2006.01)
*B64C 39/10* (2006.01)

(52) U.S. Cl.
CPC ........ *B64C 39/10* (2013.01); *B64C 2201/028* (2013.01)

(58) Field of Classification Search
CPC .... B64C 5/00; B64C 5/02; B64C 5/06; B64C 5/10; B64C 5/12; B64C 5/14; B64C 5/16; B64C 5/18
See application file for complete search history.

(56) References Cited

U.S. PATENT DOCUMENTS

| | | | | |
|---|---|---|---|---|
| 5,681,010 | A * | 10/1997 | Jensen | B64C 1/34 244/49 |
| 6,179,248 | B1 * | 1/2001 | Putman | B64C 3/30 244/35 R |
| 7,766,275 | B2 * | 8/2010 | Hawley | B64D 27/26 244/36 |
| 7,841,559 | B1 * | 11/2010 | O'Shea | B64C 39/024 244/49 |
| 2007/0170309 | A1 | 7/2007 | Schafroth | |
| 2010/0243795 | A1 | 9/2010 | McDonnell | |
| 2012/0267472 | A1 * | 10/2012 | Pratzovnick | B64C 39/024 244/119 |

FOREIGN PATENT DOCUMENTS

| | | |
|---|---|---|
| CN | 101795939 A | 8/2010 |
| CN | 103171766 A | 6/2013 |
| CN | 203666966 U | 6/2014 |
| FR | 839417 A | 4/1939 |
| WO | 2010143179 A1 | 12/2010 |

OTHER PUBLICATIONS

Agenbag, Daniël S. "Longitudinal Handling Characteristics of a Tailless Gull-Wing Aircraft." Longitudinal Handling Characteristics of a Tailless Gull, University of Pretoria, University of Pretoria, Jul. 28, 2008, https://repository.up.ac.za/bitstream/handle/2263/28011/Complete.pdf?sequence=6 (Year: 2008).*

Agenbag, Daniël S. "Longitudinal Handling Characteristics of a Tailless Gull-Wing Aircraft." Longitudinal Handling Characteristics of a Tailless Gull, University of Pretoria, University of Pretoria, Jul. 2008, https://paperzz.com/doc/7897016/longitudinal-handling-characteristics-of-a-tailless-gull. (Year: 2008).*

Agenbag, "Longitudinal Handling Characteristics of a Tailless Gull-Wing Aircraft", University of Pretoria, 2008, p. 120, Fig 4.2.

Agenbag et al., "Pitch Handling Qualities Investigation of the Tailless Gull-Wing Configuration", Journal of Aircraft, 2009, pp. 683-691, vol. 46, No. 2.

* cited by examiner

TAILLESS AIRCRAFT

CROSS-REFERENCE TO RELATED APPLICATIONS

This application is the United States national phase of International Application No. PCT/IB2018/050307 filed Jan. 18, 2018, and claims priority to South African Patent Application No. 2017/00443 filed Jan. 19, 2017, the disclosures of which are hereby incorporated by reference in their entirety.

BACKGROUND OF THE INVENTION

Field of the Invention

This invention relates to an aircraft. It further relates to a method of controlling an aircraft in flight.

Description of Related Art

All the energy of flight is transferred from a flight body to the surrounding viscous medium through which the flight body is moving as the shear forces and pressure interactions between the flight body and the viscous medium change the momentum and the temperature of the medium. It is in the interest of any operator of any flight to transfer only the minimum amount of energy to the surrounding medium for the sake of good flight economy. Accordingly, in the interests of efficiency, some design qualities which should be concurrently minimized during the process of flight body design include:
- The flight body should be minimized in terms of its requirement for lift;
- It should be minimized in terms of its transfer of momentum by shear and pressure forces to the surrounding viscous medium; and
- It should shed the minimum kinetic energy for the change of momentum required to produce lift.

Aircraft of the current art of which the Inventor is aware do not fully achieve any of these three objectives and therefore consume more energy during flight than would be physically necessary to achieve a given flight objective. It is an object of this invention to provide means which the Inventor believes will at least ameliorate some of the inefficiencies associated with the prior art.

SUMMARY OF THE INVENTION

According to one aspect of the invention, there is provided an aircraft which includes:
- a tailless fuselage which has a body which includes a transverse trailing edge, the body having a fineness ratio of between 3 and 7; and
- a wing having two sides which protrude from opposite sides of the fuselage.

The fineness ratio may be 4.5.

In the context of this specification the term "tailless fuselage" is to be understood as a fuselage without an empennage and in particular which does not have a vertical stabiliser at the rear of the fuselage and which does not have a rearward fuselage extension specifically for the purpose of holding the empennage.

The aircraft may include a power source for propelling the aircraft.

The trailing edge of the fuselage may be adjustable. The body may include a bulbous primary section and a flap which is connected to the primary section and which forms the trailing edge. The flap may be displaceable relative to the primary section to permit adjustment of the trailing edge. The flap may be displaceable relative to the primary section about a transverse axis. In particular, the flap may be displaceable upwardly, relative to a neutral position, by up to 30° and downwardly relative to the neutral position, by up to 60°. The neutral position is the position the flap would occupy during steady state horizontal flight at cruising velocity.

In the context of this specification, the Fineness Ratio will be understood to be the Body Length/Effective Diameter.

The Body Length is the distance from the nose to the end of the primary section of the body (thus the extension of the body by the flap would not be included in the Body Length).

The Effective Diameter for a round body would be its maximum diameter, and for a non-round body would be the square root of its maximum width times its maximum height.

The width of the trailing edge may be adjustable. The flap may include a plurality of transversely spaced sections which are laterally displaceable relative to one another in order to increase or decrease the width of the trailing edge. The width of the flap at the trailing edge may be adjustable between 0.5 and 3 times the maximum width of the primary section of the body.

The longitudinal position of the trailing edge may be adjustable. To this end, the effective length of the flap may be adjustable.

Each side of the wing may have an inner section which is inclined upwardly away from the body and an outer section which is inclined downwardly. At least a portion of each side of the wing may be swept back. The inner section of each side of the wing may be swept forward with a positive dihedral and the outer section of each side of the wing may be swept back with a negative dihedral or anhedral. With sweep angles typically defined on a quarter chord line of the wing, the inner wing sweep angle, i.e. the sweep angle of the inner portion of each side of the wing, may be approximately 5° forward and the outer wing sweep angle, i.e. the sweep angle of the outer portion of each side of the wing, may be approximately 25° backward. Inner wing dihedral of each side of the wing may be approximately 3° and outer wing anhedral of each side of the wing may be approximately 5° for a wing arranged in a shoulder wing position.

One disadvantage of a wing optimised for flight efficiency is that it typically has insufficient volume or internal height in order to accommodate a payload or other large elements. Therefore, a fuselage has to be provided. The fuselage may have a volume which is typically approximately four times the volume of the wings. Typically, the fuselage or body in accordance with the invention will be designed to be large enough to enclose the desired payload and other large elements but at the same time avoiding or minimizing redundant volume. The body is configured to minimise structural mass and drag. To this end, it typically has a rounded nose segment in which the cross-section area gradually increases up to the point of maximum width and height or diameter such that the air pressure reduces in a way favourable for low drag and a tail segment, in which the cross-section area gradually decreases towards the sharp trailing edge of the body such that pressure recovery takes place without significant flow separation. There may be included between the two a segment of the body of constant cross-section area, with their surfaces joining tangentially, but this will be minimised in terms of length, preferably of zero length. Both the nose segment and tail segment are minimised in terms of relative length (relative to maximum width or height) so as to maximise the volume to surface area ratio for the required volume and to minimize bending loads in the body walls. A body of smaller fineness ratio has the advantage that the structure can be lighter and of smaller wetted surface than that of alternative arrangements of higher fineness ratio.

The trailing edge on the fuselage may be adjusted such that in steady flight at cruising speeds the fuselage contributes to the total lift of the aircraft. The lift contributed by the fuselage may compensate for the lift lost due to the interruption in the wing by the fuselage. In other words, the lift distribution over the wing and the fuselage would be the approximate equivalent to the lift distribution of a corresponding uninterrupted wing having no fuselage.

This avoids the need for the wing having to be designed larger to compensate for lift lost by the presence of the fuselage which would decrease the overall efficiency of the aircraft. It would also result in the spanwise lift distribution to approximate the ideal distribution for better efficiency.

The wing may include adjustable control surfaces to provide longitudinal and lateral control and to adjust the trim or balance of the aircraft. In one embodiment of the invention, the wing may include control surfaces arranged along a trailing edge of the wing by which the spanwise lift distribution can be adjusted to approximate the ideal distribution in any flight condition.

Balance of the aircraft in flight may be achieved jointly or separately by adjusting the static margin.

The invention accordingly extends to a method of controlling an aircraft of the type described herein during flight which includes adjusting the static margin.

In one embodiment of the invention, adjustment of the static margin can be achieved by moving the relative position of the centre of gravity of the aircraft. This could be achieved by moving mass, e.g. pumping fuel or water from one location to another or by moving luggage pallets, or the like. In another embodiment of the invention this could be achieved by changing the position of the neutral point of the aircraft by, for example changing the sweep angles of at least part of the wing and/or changing the width and/or the longitudinal position of the trailing edge. To this end, an outer portion of each side of the wing may be angularly displaceable about an upwardly directed axis relative to an inner portion of each side of the wing and/or by changing the width of the fuselage flap. Further the relative position of the wing and the fuselage may be adjustable.

Changing the static margin involves changing the relative positions of the centre of gravity and the neutral point. Optimum flight efficiency can only be achieved when the centre of gravity and the centre of pressure of the ideal flow field are in register. Traditionally, for off-design positions of the centre of gravity, the centre of pressure is adjusted to agree with the location of the centre of gravity by changing the lift on the horizontal stabilizer whereby the flow field is modified and may no longer be ideal. However, by adopting procedures described above, good flight efficiency can be maintained also in off-design conditions.

The wing structure may be rooted in or close to the centre of pressure of the wing.

In a preferred embodiment of the invention, the centre of pressure of the wing and the centre of pressure of the fuselage coincide or are close to each other.

The wing may have an aspect ratio of at least 6.

According to another aspect of the invention there is provided an aircraft which includes:
a tailless fuselage; and
a wing connected to the fuselage, the wing having two sides which protrude from opposite sides of the fuselage, each side having an inner section having a first dihedral angle and an outer section having a second dihedral angle, the second dihedral angle being less than the first dihedral angle.

In a preferred embodiment of the invention, the second dihedral angle may be negative, i.e. it may be an anhedral angle.

According to another aspect of the invention there is provided an aircraft which includes: a tailless fuselage; and
a wing connected to the fuselage, the wing having two sides which protrude
from opposite sides of the fuselage, each side having an inner section, and an outer section, at least part of which is swept back.

According to another aspect of the invention, there is provided an aircraft which includes:
a tailless fuselage which has a body which has a transverse trailing edge; and
a wing connected to the fuselage, having an aspect ratio of at least 6, the wing having two sides which protrude from opposite sides of the fuselage.

A wing tip may protrude from an outer end of each side of the wing.

In one embodiment of the invention, the wing tip protrudes upwardly from the outer end of the side of the wing.

BRIEF DESCRIPTION OF DRAWINGS

The invention will now be described by way of example, with reference to the accompanying diagrammatic drawings.

In the drawings.

DESCRIPTION OF THE INVENTION

Figure 1:
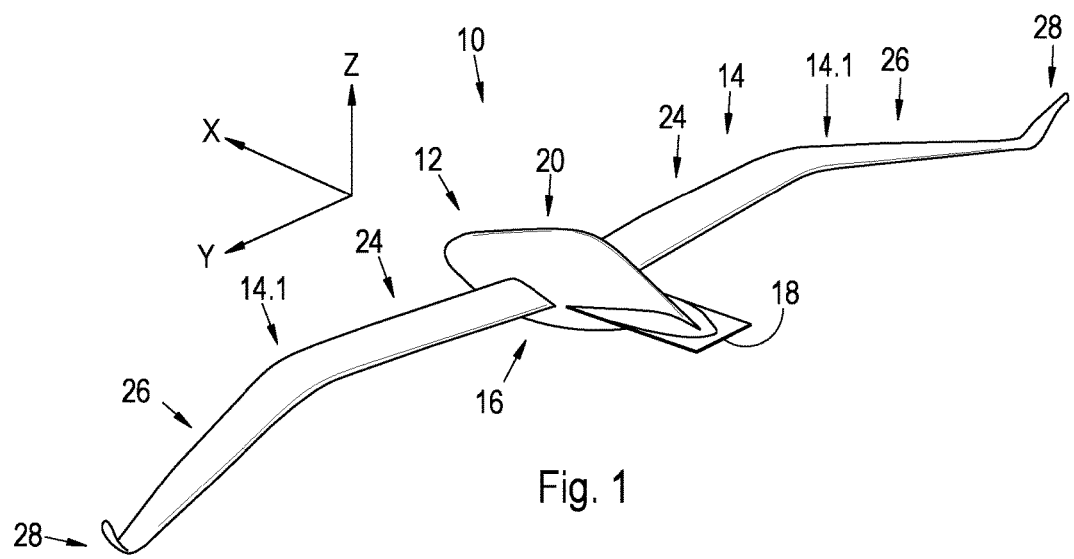
FIG. 1 shows a three-dimensional view of an aircraft in accordance with the invention.

In the drawings, reference numeral 10 refers generally to an aircraft in accordance with the invention. The aircraft 10 includes a tailless fuselage, generally indicated by reference numeral 12 and a wing 14 having two sides 14.1 connected to the fuselage 12 and extending laterally from opposite sides thereof.

Figure 5:
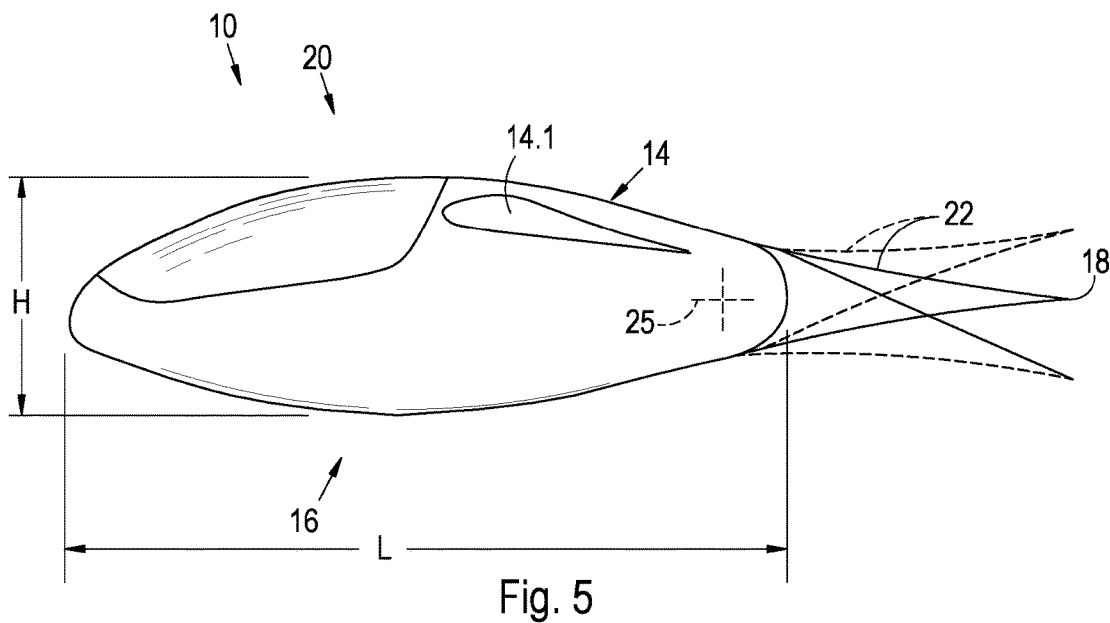
FIG. 5 shows a side view of a body of the aircraft.
Figure 6:
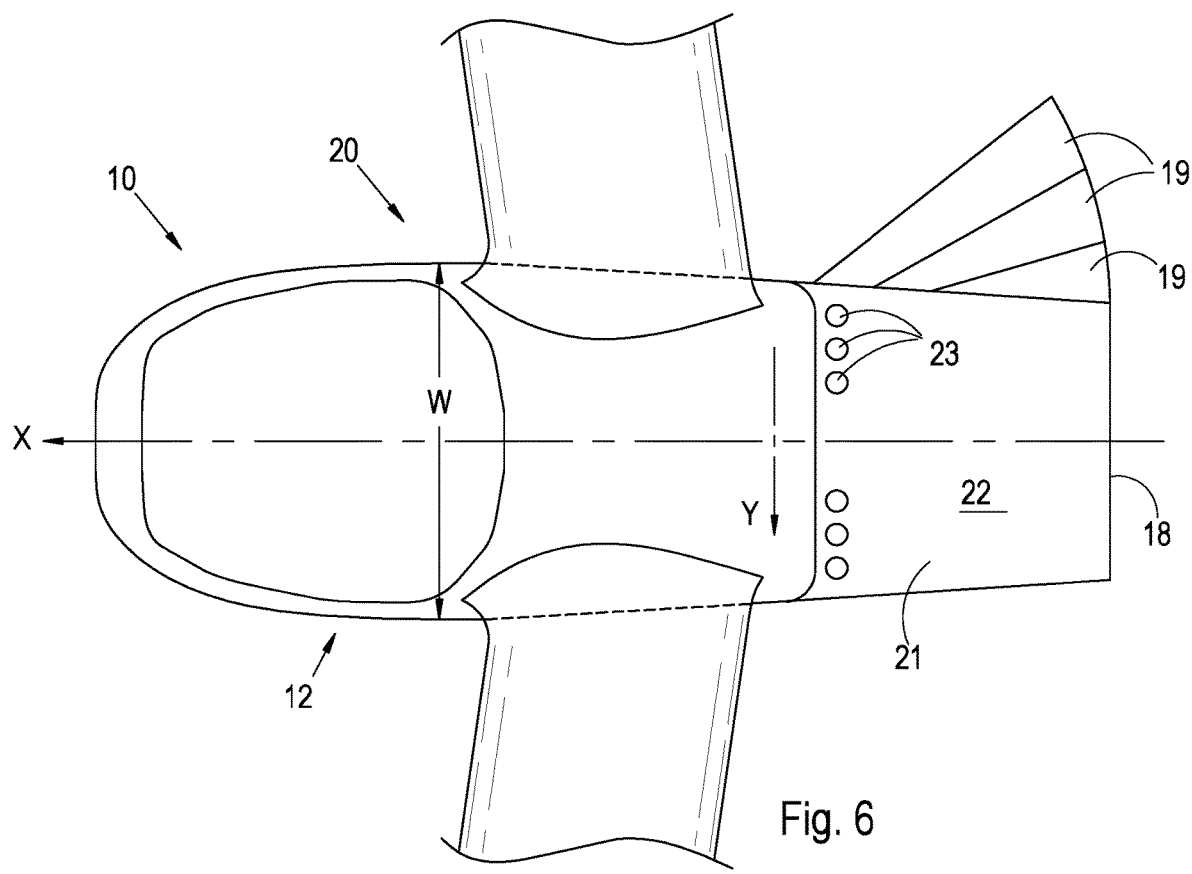
FIG. 6 shows a plan view of part of the aircraft.

The fuselage 12 includes a body, generally indicated by reference numeral 16 which terminates in a transverse trailing edge 18. In particular, the body 16 includes a hollow bulbous primary section, generally indicated by reference numeral 20 and a flap 22 which protrudes rearwardly from the primary section 20 and forms the trailing edge 18. Relative to the perpendicular X, Y and Z axes shown in FIG. 1 of the drawings, when the aircraft 10 is intended for flight in the direction of the X axis, the trailing edge 18 typically extends laterally in the direction of axis Y, i.e. typically perpendicular to the flight direction X. The position of the flap 22 relative to the primary section 20 may be adjustable to permit displacement of the flap 22 about an axis which extends in the Y direction thereby permitting the trailing edge 18 to be adjusted vertically, i.e. in the Z direction. As indicated in FIG. 5 of the drawings, the flap 22 is angularly displaceable about a transverse pivot axis 25 such that the trailing edge 18 is adjustable upwardly and downwardly. In FIG. 5 of the drawings, the trailing edge is shown in solid lines in its neutral position and as indicated by the broken lines, it is displaceable upwardly relative to the neutral position by an angle of up to 30° and downwardly relative to the neutral position by an angle of up to 60°. Further, the flap 22 may consist of a plurality of components 19 which are laterally adjustable relative to one another in order to permit the effective width of the trailing edge 18 in the Y direction to be adjusted. With particular reference to FIG. 6 of the drawings, in which, unless otherwise indicated, the same reference numerals used above are used to designate similar parts, it can be seen that the flap 22 includes a plurality of sector shaped segments 19 which are pivotally connected to a central portion 21 for pivotal displacement about vertical axes 23 which may be spaced laterally or transversely. The components 19 can be displaced between a fully extended position, as illustrated in the top half of FIG. 6 of the drawings or a retracted condition in which they do not protrude laterally beyond the edges of the central position 21 as shown in the lower half of FIG. 6 of the drawings. The components 19 are typically adjustable such that the width of the trailing edge 18 is adjustable to between 0.5 and 3 times the maximum width W (FIG. 6) of the primary section 20 of the body 16. The effective length of the flap in the X direction is adjustable to permit the trailing edge to be longitudinally adjustable in the X direction. This can be achieved in different ways, e.g. it could be achieved by having a flap comprising two or more parts which are telescopically connected and relatively displaceable in the longitudinal direction. Another option may be for the flap to be retractable, at least part way into the primary section 20 of the body 16.

The primary section 20 of the body 16 has a fineness ratio, i.e. a ratio of length to maximum width or height of the primary section of between 3 and 7 and typically of the order of 4.5. The fineness ratio is defined as the length L divided by the effective diameter D.

As can best be seen in FIG. 5 of the drawings, the length L is the length of the primary section 20 of the body 16, i.e. excluding the length of the flap 22. The Effective Diameter for a round body would be its maximum diameter, and for a non-round body, such as in the embodiment shown, it would be the square root of its maximum width W times its maximum height H (see FIGS. 5 and 6).

Figure 3:
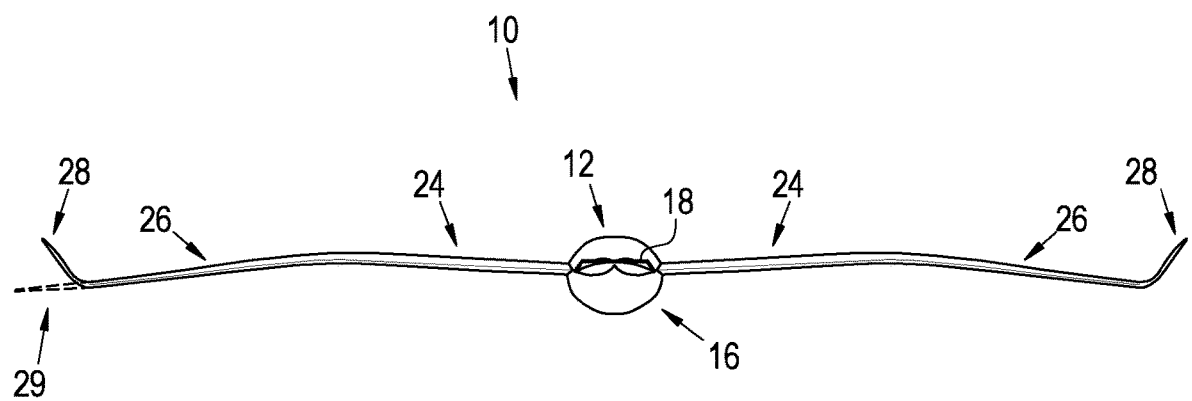
FIG. 3 shows a rear view of the aircraft of FIG. 1.
Figure 4:
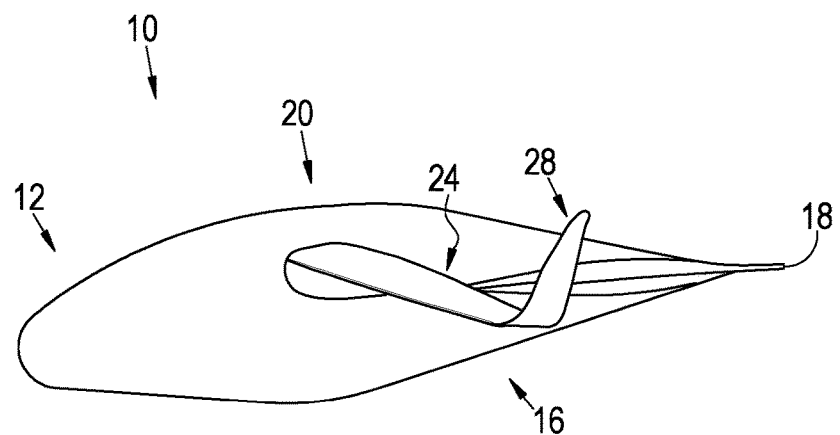
FIG. 4 shows, on an enlarged scale, a side view of the aircraft of FIG. 1.

The wing 14 has on each side 14.1 an inner section 24, an outer section 26 and an outwardly and/or upwardly directed wingtip 28. The inner section 24 is forwardly swept with a positive dihedral angle. In this regard, typically, the dihedral angle is 3°. The outer section 26 is swept back with a reduced dihedral angle. In a preferred embodiment of the invention, the outer section 26 may have a negative dihedral angle, i.e. anhedral, typically 5°. The wingtip 28 extends from the outer section and in the embodiment shown is inclined upwardly. The wingtip can be inclined upwardly at an angle of inclination of up to 90° to the Y axis. In another embodiment of the invention, the wingtip forms an extension of the outer section of the wing as shown in broken lines in FIG. 3 of the drawings and as indicated by reference numeral 29.

Figure 2:
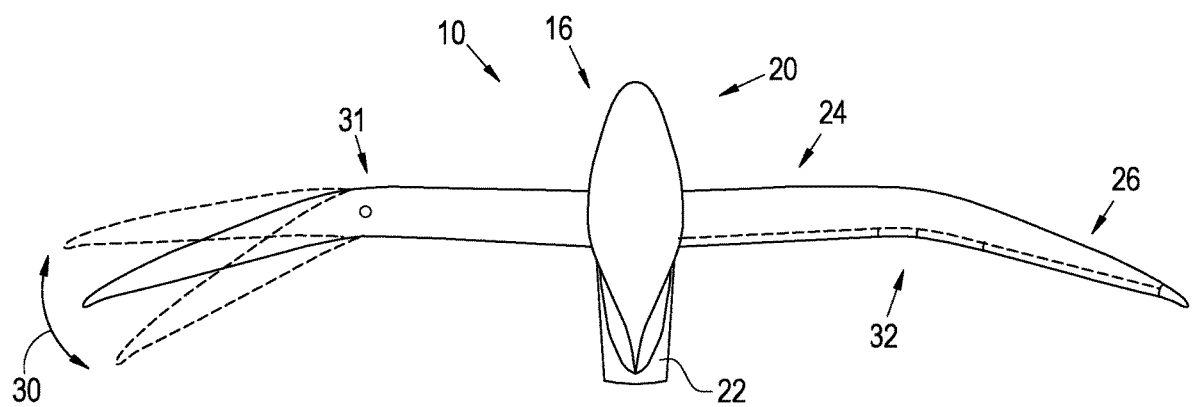
FIG. 2 shows a top view of the aircraft of FIG. 1.

If desired, as indicated in FIG. 2 of the drawings, the outer section 26 of each side 14.1 of the wing may be angularly displaceable, as indicated by arrow 30, about an upwardly directed axis, generally indicated by reference numeral 31, relative to the inner portion 24 to effect a change in the sweep angle of the wing.

Further, the wing 14 includes adjustable control surfaces, generally indicated by reference numeral 32 (FIG. 2) along the trailing edge thereof to provide longitudinal and lateral control and to adjust the trim of the aircraft.

The Inventor believes that an aircraft in accordance with the invention will include numerous advantages over the prior art.

The fuselage of the current art provides for sufficient length to hold and mass balance the empennage. This either introduces fuselage volume which is not useful for any other purpose or it may lead to fuselage fineness ratios which are sub-optimal in terms of mass and drag. This invention does not employ the empennage. One advantage is then, that the central single body can therefore be shaped in favour of minimum drag and mass for the required design conditions. The resulting fineness ratio is such that the fuselage is typically shorter and may be of increased lateral dimensions when compared with the prior art. This results in lower bending moments in the structure and less surface skin, requiring less material and hence reduced mass and drag when compared to the fuselage of the current art. A further advantage is, that this shorter fuselage can be fitted with a fuselage flap rather close to the aircraft wing and centre of gravity. This can then be adjusted such that it can provide circulation or lift over the fuselage of sufficient magnitude to compensate for that which is lost by the wing due to the fuselage occupying the wing. One advantage is then, that it is in principle possible to fly the aircraft with an ideal spanwise lift distribution. Another advantage is, that the wing can be smaller and with smaller bending moments than otherwise, without the lift contribution by the fuselage.

Circulation intensity over the fuselage can be controlled by means of adjusting the size and the angle of the fuselage flap. This can then be used in conjunction with the high-lift devices on the wing to offer a very high combined lift coefficient for the flight body. One advantage then is, that the effective wing loading can be reduced by fully spreading the flap to its widest size and/or extending the flap during flight phases where this is desirable like during takeoff, turning and loitering. Another advantage is that the flap system can be set to reduce effective wing loading as mentioned above and additionally increasing its lift coefficient and drag coefficient during flight phases where this is desirable like during approach and landing. Thus, the current invention provides for a fuselage which can make a significant contribution to the total lift when required. This has advantageous implications on the design size and mass of the wing and the requirement for the high lift devices on the wing.

The trailing edge of the fuselage of this invention bestows an aerodynamic centre on the fuselage. The advantage of this is that the fuselage can then be longitudinally statically stable and therefore it does not require the additional horizontal stabilizer wing of the current art.

Another advantage of this arrangement is that the adjustment of the flap can change the position of the aerodynamic centre and the centre of pressure and it can therefore be used to control circulation, the pitching moment and the damping. It can also be used as an airbrake for descent angle control or in an emergency dive.

The central fuselage of this invention may have to be wider than that of the comparable current art. This has the advantage that, for a given span of wing, the length of the exposed wing is shorter with structural mass benefits on the wing bending structure.

A wing flying in the wake of another, like the tail wing of the current art flying in the wake of the main wing, encounters disturbed air while also distorting the flow field of the leading wing. The wake behind a multi-wing aircraft is a complex flow field in which all induced disturbances are combined. It is difficult to avoid a penalty on flight economy when using such an arrangement of wings as used in the typical current art. In contrast, the current invention provides for an aircraft in which the flow over its wing and fuselage is not adversely disturbed by another wing, neither leading nor trailing.

Yet another advantage of the invention is that it provides for a flight body to which the wing can offer an appropriate pitch curve slope to provide, in combination with the stable fuselage the desired overall longitudinal static stability. Further, the wing offers suitable lateral stability to have, in combination with the fuselage the desired lateral stability properties. The vertical stabilizing and controlling wing found in the typical current art has mass and causes drag while it is making no positive contribution to the flight economy. The present invention provides for a flight body layout which can do without it. To help achieve desirable properties for lateral stability, control, damping and trim, this invention provides the outer wing portions and the wingtips. Depending on the required combination of properties these tips can be arranged either as mere extensions of the outer wing portion or they can be angled upwardly relative to the outer wing portion. Their twist relative to the outer wing portion can be used to tailor the lift distribution suitable in terms of pro-verse yaw (avoiding adverse yaw) and wing tip stalling (avoiding wing tip stalling) but, their effective twist can also be such that they make a positive contribution to the flight economy during normal flight.

The control strategy for pitch trim of the current art usually imposes a penalty on flight economy. In contrast, this invention provides for a control strategy for pitch trim which can in principle be without this penalty.

The downwash profile in the wake of a flight body of the current art is usually not ideal, in other words, span efficiency is usually compromised. This invention allows for the manipulation of the wing and fuselage geometry to maintain the ideal lift distribution to induce the ideal downwash profile at all useful flight conditions, in other words, the span efficiency does not have to be compromised.

The fuselage typical of the current art protrudes rearwardly from the landing gear to an extent which limits the angle of aircraft nose-up attitude when on or near the ground. In contrast, the invention provides for a flight body in which the reduced rearward extent of the fuselage allows a higher nose-up attitude. Then the fuselage and wing can operate at higher angles of attack to exploit their respective maximum circulation. In such condition of operation the drag is also high which may be useful, for example, to allow for a steeper approach path during landing and/or a shorter roll-out after touch-down.

Tilt rotor or tilt wing aircraft or other VTOL aircraft of the current art require complex structures and mechanism to tilt either the engine nacelle or jet ducts or the entire wing on the fuselage for vertical takeoff and or landing and to change their tilt angle during flight for normal flight. Fan or jet driven VTOL aircraft of the current art may alternatively include elaborate secondary ducts. The shorter fuselage of the current invention offers the opportunity to provide a flight body which can be tilted to a nose-up attitude such that its main propelling rotors, fans or jets could act as lifting devices for vertical takeoff and or landing without any changes to the flight body and which can remain unchanged as thrusting devices for normal flight.

The arrangement of the wing of the current invention allows for the wing tip clearance to be made as desired for exploitation of the ground effect. This can be useful on any aircraft during takeoff and landing but in particular it may be useful in wing-in-ground effect vehicles. The configuration of the current invention is therefore suitable to such wing-in-ground effect vehicles but it is also suitable to offer good short-field operation properties for normal aircraft.

In the typical current art wing tip clearance when on the ground is not, in general an independent design variable. It depends from the vertical position of the wing, its span, sweep and dihedral angle and the length of the undercarriage. To provide acceptable wing tip clearance, the lateral stability properties of the flight body are sometimes compromised. The main wing arrangement of the current invention allows for the additional wing design variables of inner wing sweep and dihedral such that wing tip clearance is an independent design variable by which such compromise, like the tendency to Dutch roll, can be avoided.

This invention provides for a flight body in which the primary wing structure can be rooted in or close to the centre of pressure of the wing. It is desirable to have the centre of pressure of the wing and that of the fuselage in close proximity to each other, ideally to coincide. For balanced flight the flight body centre of gravity needs to coincide with the flight body centre of pressure. Therefore, this invention provides for a layout in which the primary wing structure can root in or close to the centre of gravity. This is advantageous in terms of structural load paths and aero-elastic properties to allow for a flight body that is lighter than that of much of the current art.

The invention claimed is:

1. An aircraft comprising:
   a tailless fuselage having a body which includes a transverse trailing edge, the body including a bulbous primary section and a flap which is connected to and protrudes rearwardly from the primary section and forms the transverse trailing edge the flap comprising a plurality of components which are laterally adjustable relative to one another and to the primary section in order to adjust the width of the transverse trailing edge; and
   a wing having two sides which protrude from opposite sides of the fuselage.

2. The aircraft as claimed in claim 1, wherein the body has a fineness ratio of between 3 and 7.

3. The aircraft as claimed in claim 1, further comprising a power source for propelling the aircraft.

4. The aircraft as claimed in claim 1, wherein the flap is displaceable relative to the primary section about a transverse axis and/or wherein the width of the trailing edge is adjustable and/or wherein the position of the trailing edge is longitudinally adjustable.

5. The aircraft as claimed in claim 4, wherein the flap is displaceable upwardly relative to a neutral position by up to 30° and downwardly relative to the neutral position by up to 60°.

6. The aircraft as claimed in claim 1, wherein the flap comprises a plurality of transversely spaced sector shaped segments which are pivotally displaceable about vertical axes.

7. The aircraft as claimed in claim 6, wherein the flap comprises a central portion which is connected to the primary section for displacement about a transverse pivot axis, the sector shaped segments being pivotally connected to the central portion.

8. The aircraft as claimed in claim 7, wherein the segments are displaceable relative to the central portion between a retracted condition in which they do not protrude laterally beyond edges of the central portion and an extended position in which they protrude laterally beyond the edges of the central portion.

9. The aircraft as claimed in claim 6, in which at least some of the sector shaped segments are pivotally displaceable about laterally spaced vertical axes.

10. The aircraft as claimed in claim 1, wherein the width of the transverse trailing edge is adjustable between 0.5 and 3 times a maximum width of the primary section of the body.

11. The aircraft as claimed in claim 4, wherein an effective length of the flap is adjustable to permit adjustment of the longitudinal position of the transverse trailing edge.

12. The aircraft as claimed in claim 1, wherein each side of the wing has an inner section which is inclined upwardly away from the body and an outer section which is inclined downwardly, at least a portion of each side of the wing being swept back, an inner section of each side of the wing being swept forward with a positive dihedral and an outer section of each side of the wing is swept back with a negative dihedral, a sweep angle defined on a quarter chord line of the inner section of each side of the wing is 5° forward and a sweep angle defined on a quarter chord line of the outer section of each side of the wing is 25° backward.

13. The aircraft as claimed in claim 1, wherein the wing is arranged in a shoulder wing position and an inner wing dihedral of each side of the wing is 3° and the outer wing anhedral of each side of the wing is 5°.

14. The aircraft as claimed in claim 1, wherein the tailless fuselage is configured such that in steady flight at cruising speed, the tailless fuselage contributes to a total lift of the aircraft, and wherein a first lift contributed by the tailless fuselage compensating for a second lift lost due to an interruption in the wing by the tailless fuselage.

15. The aircraft as claimed in claim 1, wherein the wing comprises adjustable control surfaces to provide longitudinal and lateral control and to adjust a trim of the aircraft, the adjustable control surfaces being arranged along the transverse trailing edge of the wing by which the spanwise lift distribution can be adjusted to approximately an ideal distribution in any flight condition.

16. The aircraft as claimed in claim 1, wherein a static margin is adjustable in flight by one or more of moving a relative position of the centre of gravity of the aircraft and by changing a position of a neutral point of the aircraft.

17. An aircraft comprising:
a tailless fuselage having a body which has a transverse trailing edge; and
a wing connected to the tailless fuselage, the wing having two sides which protrude from opposite sides of the tailless fuselage, the body including a bulbous primary section and a flap which forms the transverse trailing edge, the flap being connected to the primary section, at least part of the flap being displaceable to permit the transverse trailing edge to be displaced upwardly and downwardly relative to a neutral position and a width of the transverse trailing edge to be adjustable.

18. A method of controlling flight of an aircraft as claimed in claim 1, the method comprising adjusting a static margin.

19. The method as claimed in claim 18, in which static margin is adjustable by at least one of moving a relative position of a centre of gravity of the aircraft, and changing the position of a neutral point of the aircraft.

* * * * *

UNITED STATES PATENT AND TRADEMARK OFFICE
CERTIFICATE OF CORRECTION

PATENT NO. : 11,554,849 B2
APPLICATION NO. : 16/478574
DATED : January 17, 2023
INVENTOR(S) : Reinhard Joachim Huyssen It is certified that error appears in the above-identified patent and that said Letters Patent is hereby corrected as shown below:

In the Claims

Column 8, Line 36, Claim 1, delete "edge" and insert -- edge, --

Column 9, Line 30, Claim 14, delete "that" and insert -- that, --

Column 10, Line 29, Claim 19, delete "aircraft," and insert -- aircraft --

Signed and Sealed this
Fourteenth Day of March, 2023

Katherine Kelly Vidal
*Director of the United States Patent and Trademark Office*